No. 828,223. PATENTED AUG. 7, 1906.
H. G. LEISENRING.
DETACHABLE TIRE RIM.
APPLICATION FILED APR. 20, 1906.

Witnesses
R. A. Boswell
A. L. Hough

Inventor
H. G. Leisenring,
By Franklin H. Hough
Attorney

UNITED STATES PATENT OFFICE.

HENRY G. LEISENRING, OF WAYNE, NEBRASKA.

DETACHABLE TIRE-RIM.

No. 828,223.　　　　Specification of Letters Patent.　　　　Patented Aug. 7, 1906.

Application filed April 20, 1906. Serial No. 312,876.

*To all whom it may concern:*

Be it known that I, HENRY G. LEISENRING, a citizen of the United States, residing at Wayne, in the county of Wayne and State of Nebraska, have invented certain new and useful Improvements in Detachable Tire-Rims; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in means for fastening tires upon rims of wheels, and comprises various details of construction and combinations and arrangements of parts, which will be hereinafter fully described and then specifically defined in the appended claims.

My invention is illustrated in the acccompanying drawings, in which—

Figure 1:
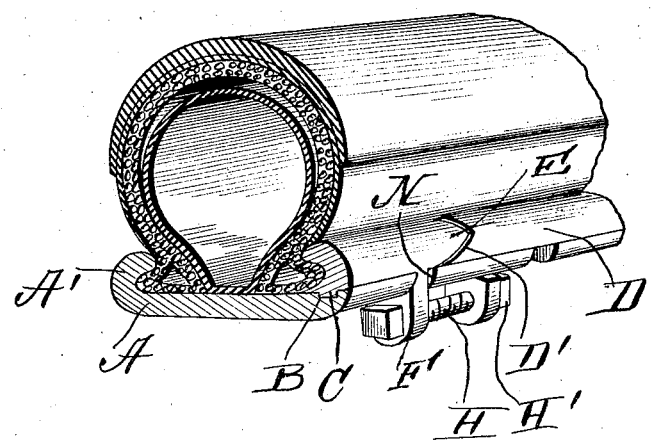
Figure 2:
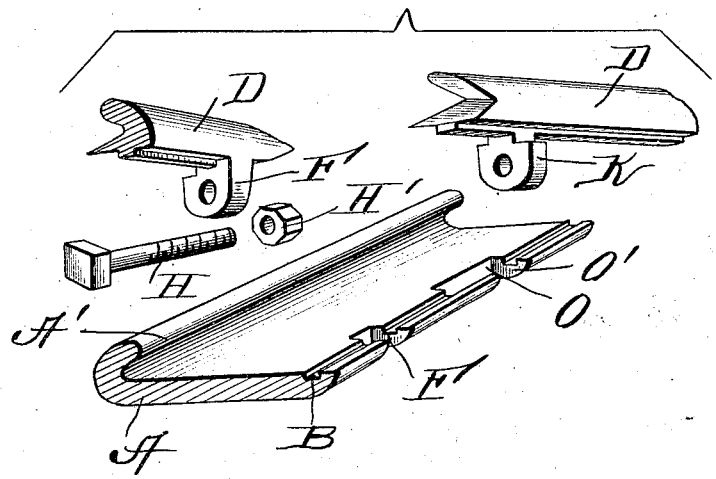

Figure 1 is a perspective view of my invention, and Fig. 2 is a perspective view showing the parts disassembled.

Reference now being had to the details of the drawings by letter, A designates a rim having a curved flange A' at one side adapted to engage one side of the tire, and a groove B is formed opposite said flange longitudinally with the rim and adapted to receive a rib C, which is formed upon the under edge of the strip D, forming the clencher for holding one side of the tire to the rim. Said strip D has one end recessed, as at D', and the opposite end E is pointed, adapted to conform to said recess D'.

Projecting from the end of the strip D is a lug F, apertured to receive a bolt H, and said lug is adapted to rest in a recess or slot N, cut in the edge of the rim. The opposite end of the strip D is also provided with a lug K, adapted to seat in a recess O, having a constricted opening O' leading thereto. Said recess O, it will be noted, is somewhat elongated for the purpose of holding the lug K therein when the two ends of the strip are brought together into interlocked relation, as shown in Fig. 1. Said bolt is adapted to pass through registering apertures in said lugs, and a nut H', fitted upon the threaded end of the bolt, is designed to draw the two ends together, thereby securely holding the tire to the rim.

From the foregoing it will be noted that by the provision of the apparatus shown and described a simple and efficient means is provided for holding tires to rims and so arranged that tires may be easily and quickly removed when desired and replaced.

What I claim is—

1. An apparatus for fastening tires to rims of wheels, comprising a rim having one edge flanged and a longitudinal groove adjacent to the opposite edge, a flanged strip having a rib adapted to seat in said groove, said strip having laterally-projecting lugs, slots in the edge of the rim, one of said slots being elongated and having a contracted opening adapted to hold one of the lugs from moving laterally and fastening means for holding said strip to the rim, as set forth.

2. An apparatus for fastening tires to rims of wheels, comprising a rim having one edge flanged and a longitudinal groove adjacent to the opposite edge, a flanged strip having a rib adapted to seat in said groove, said strip having laterally-projecting lugs which are apertured, slots in the edge of the rim, one of said slots being elongated and having a contracted opening adapted to hold one of the lugs from moving laterally, the ends of said strips adapted to interlock, a bolt passing through the apertures in said lugs, and a nut fitted on the threaded end of the bolt, as set forth.

In testimony whereof I hereunto affix my signature in the presence of two witnesses.

HENRY G. LEISENRING.

Witnesses:
　H. B. JONES,
　C. H. SWEET.